US008405495B2

(12) United States Patent
Heller et al.

(10) Patent No.: US 8,405,495 B2
(45) Date of Patent: Mar. 26, 2013

(54) METHOD AND DEVICE FOR LOCATING THE WHEELS OF A VEHICLE

(75) Inventors: Jean-Marc Heller, Tournefeuille (FR); Dominique Rantet, Beaumont sur Lèze (FR)

(73) Assignee: Continental Automotive France, Toulouse (FR)

( * ) Notice: Subject to any disclaimer, the term of this patent is extended or adjusted under 35 U.S.C. 154(b) by 520 days.

(21) Appl. No.: 12/601,641

(22) PCT Filed: May 21, 2008

(86) PCT No.: PCT/EP2008/004063
§ 371 (c)(1),
(2), (4) Date: Jan. 25, 2010

(87) PCT Pub. No.: WO2008/145289
PCT Pub. Date: Dec. 4, 2008

(65) Prior Publication Data
US 2010/0171604 A1 Jul. 8, 2010

(30) Foreign Application Priority Data

May 25, 2007 (FR) ..................................... 07 03729

(51) Int. Cl.
*B60Q 1/00* (2006.01)
(52) U.S. Cl. ........ 340/438; 340/442; 340/444; 340/901; 340/904; 340/500; 116/28 R; 116/34 R
(58) Field of Classification Search .................. 340/438
See application file for complete search history.

(56) References Cited

U.S. PATENT DOCUMENTS

| 7,104,438 | B2* | 9/2006 | Benedict | 235/375 |
|---|---|---|---|---|
| 2002/0084896 | A1* | 7/2002 | Dixit et al. | 340/447 |
| 2003/0048178 | A1* | 3/2003 | Bonardi et al. | 340/442 |
| 2010/0085212 | A1* | 4/2010 | Gerardiere | 340/870.28 |

FOREIGN PATENT DOCUMENTS

| DE | 19652365 | 4/1998 |
|---|---|---|
| EP | 1340629 | 9/2003 |
| EP | 1669220 | 6/2006 |

OTHER PUBLICATIONS

International Search Report dated Aug. 20, 2008, in PCT application.

* cited by examiner

*Primary Examiner* — George Bugg
*Assistant Examiner* — Anthony D Afrifa-Kyei
(74) *Attorney, Agent, or Firm* — Young & Thompson

(57) ABSTRACT

A method and device for locating n wheels of a vehicle each equipped with an electronic module designed to emit, to a central unit, electromagnetic signals representative of operating parameters of each wheel and an identification code of the latter. There is, in a fixed position on the vehicle, in the vicinity of at least (n-1) wheels, a radio-tag in which is stored a location code, able to be identified by the central unit and enable the latter to locate the position of the radio-tag on the vehicle. In order to locate the wheels, an activation of each radio-tag is controlled so as to deliver to the central unit a signal incorporating the location code of this radio-tag associated with the identification code of the wheel located in the vicinity of the latter. The electromagnetic signals incorporate a final portion consisting of a pure wave, and the activation of the radio-tags is done so as to insert the location codes into the electromagnetic signals by modulating the absorption/reflection of the pure waves.

13 Claims, 1 Drawing Sheet

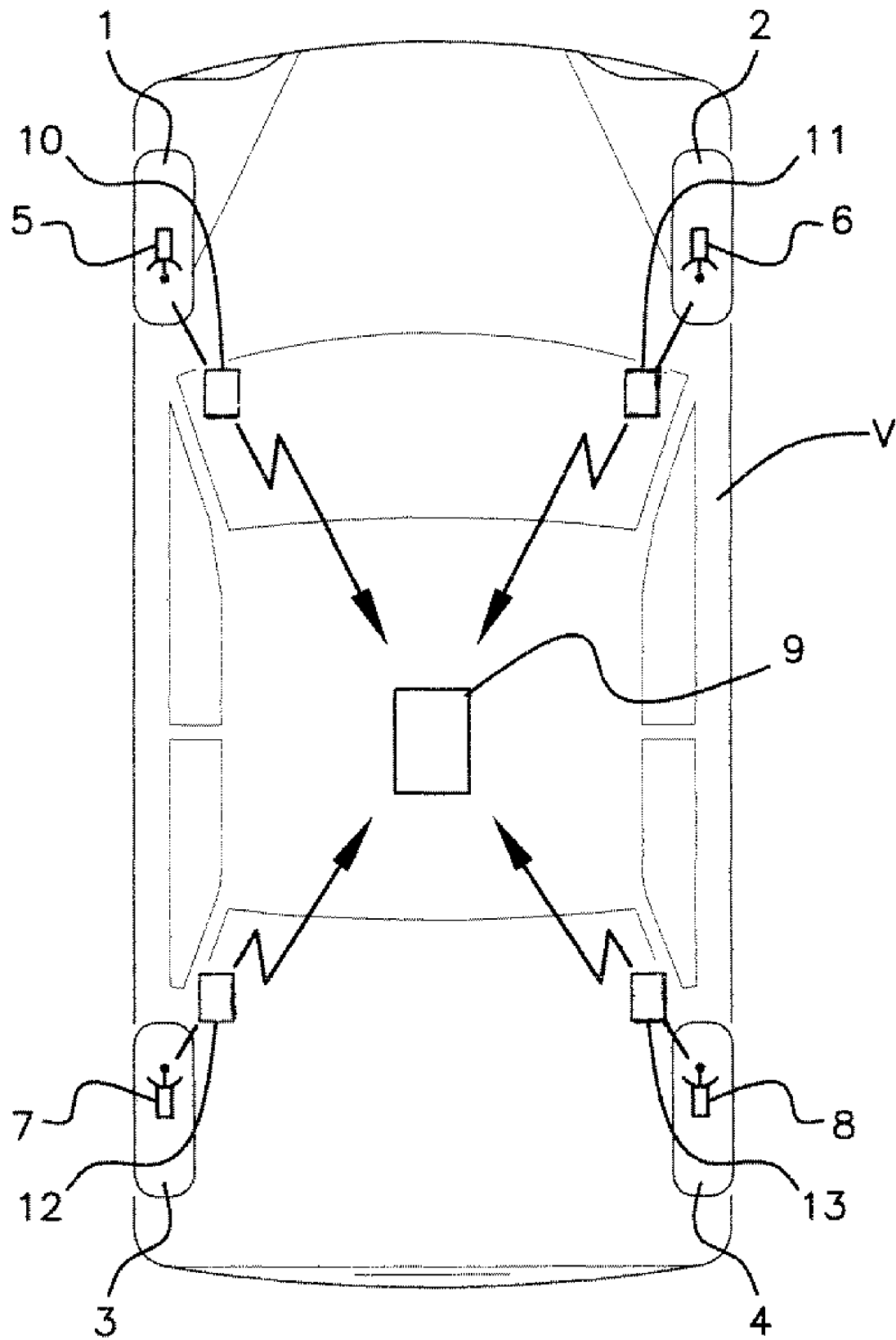

METHOD AND DEVICE FOR LOCATING THE WHEELS OF A VEHICLE

The invention relates to a method of and a device for locating the wheels of a vehicle. The invention is more particularly implemented in an electronic module designed to be mounted on a vehicle wheel in order to measure at least one operating parameter of said wheel.

More and more motor vehicles now have, for safety purposes, monitoring systems including sensors mounted on each of the wheels of the vehicle, dedicated to measuring parameters, such as pressure or temperature, of the tires fitted on these wheels, and intended to inform the driver of any abnormal variation of the measured parameter.

These monitoring systems are conventionally provided, on the one hand, with electronic modules mounted on each of the wheels of the vehicle, and incorporating, in addition to the abovementioned sensors, a microprocessor and a radio frequency emitter, and on the other hand, with a central unit for receiving the signals emitted by the emitters, including a computer incorporating a radio frequency receiver connected to an antenna.

One of the problems that such monitoring systems have to resolve lies in the need to have to associate with each signal received by the receiver of the central unit, an indication concerning the location of the electronic module and therefore of the wheel at the origin of this signal, this obligation lasting throughout the life of the vehicle, that is to say, having to be observed even after wheel changes or, more simply, reversals of the position of these wheels.

At the present time, a first location method consists in using three low-frequency antennas, each positioned close to one of the wheels of the vehicle, and in performing a location procedure consisting in successively exciting each of these three antennas by the emission of a low-frequency magnetic field.

According to this procedure, the electronic module mounted on the wheel located close to the excited antenna controls, in response and addressed to the central unit, the emission of a low-frequency signal including an identification code of said electronic module, so that the successive excitation of the three antennas leads to the location of the three electronic modules mounted on the wheels adjacent to these antennas, and, by deduction, to the location of the fourth electronic module.

The main benefit of such a method lies in the fact that the location procedure is very rapid and leads to an almost instantaneous location after the vehicle has started up.

However, this solution requires the vehicle to be equipped with three antennas with all the attendant extras: connecting cables, control amplifiers, etc., so that it is costly.

In order to limit the cost required by the location procedure, a second solution currently implemented consists, firstly, in reducing the number of antennas to two, and in positioning these two antennas close to the two front wheels, so as to allow said two front wheels to be located, and the latter to be differentiated from the two rear wheels.

This second solution combines, furthermore, with the use of the two antennas, a technique based on a statistical method consisting in comparing the accelerations of the wheels when turning, to obtain a discrimination between the left wheels and the right wheels.

Because of the elimination of an antenna, this second solution is, as mentioned above, less costly than that described previously. However, this saving is achieved at the cost of the rapidity of the location procedure which is, according to this second solution, relatively lengthy because of the fact that a consequential running time is required to obtain the left/right discrimination.

The present invention aims to overcome this drawback and its main objective is to provide a location method that is highly efficient in terms of responsiveness and reliability, whose implementation generates, furthermore, an overall cost price that is significantly less than that generated by the implementation of the current methods described hereinabove.

To this end, the invention is aimed at a method of locating wheels of a vehicle on which are mounted n wheels each equipped with an electronic module designed to emit, to a central unit mounted on said vehicle, electromagnetic signals representative of operating parameters of each wheel. These electromagnetic signals also incorporate an identification code of the wheel.

According to the invention, this location method consists:
  in having, in a fixed position on the vehicle, in the vicinity of at least (n-1) wheels, an emission means in which is stored a code, called location code, able to be identified by the central unit and to enable the latter to locate the position of said emission means on the vehicle,
  and in implementing a location procedure consisting in:
    controlling an activation of each emission means upon the emission of an electromagnetic signal by the electronic module located in the vicinity of said emission means, and
    in inserting said location code into said electromagnetic signal by modulating the absorption/reflection of said electromagnetic signals, and
    in delivering to the central unit a signal incorporating the location code of said emission means associated with the identification code of the wheel located in the vicinity of the latter,
  said location method being characterized in that:
    radio-tags are used as emission means,
    the emission by the electronic modules of electromagnetic signals incorporating a final portion consisting of a pure wave is controlled, and
    the radio-tags are activated so as to insert the location codes into the electromagnetic signals by modulating the absorption/reflection of said pure waves.

The inventive method therefore simply requires, in order to locate n wheels, n-1 radio-tags each positioned in the vicinity of a wheel so that the electromagnetic coupling between each radio-tag and the adjacent wheel is significantly greater than that that exists between this radio-tag and the other wheels, and that, consequently, each radio-tag influences only the adjacent wheel and is influenced only by the latter.

This coupling makes it possible, in practice, to implement the inventive location method according to which:
  an activation of each radio-tag, that is, a transmission of the location code stored in the latter, is controlled,
  and, thanks to the electromagnetic coupling, this location code is associated, in a signal delivered to the central unit, with the identification code of the adjacent electronic module, so that said central unit has the information required to locate said electronic module.

Such a location method is therefore very inexpensive to implement because it requires, for its implementation, simple radio-tags of minimal cost, and a software adaptation of the electronic modules.

Furthermore, because of its very design, from which follows a great simplicity of implementation, this method is very efficient in terms of responsiveness and reliability.

It should be noted that, according to the invention, the term "radio-tags" is used to define markers commonly comprising an antenna, a silicon chip and a substrate and/or an encapsulation, designed for the implementation of a so-called radio frequency identification (RFID) technique, which can be used to store data in said radio-tags (data consisting, according to the invention, of location codes), then to recover (read) this data:
- either by using active radio frequency-emitting devices, called readers, designed to supply the radio-tags that are located in their short-distance action radius with the energy needed to emit a signal. Such radio-tags are commonly qualified as "passive",
- or by equipping each radio-tag with a battery able to supply it with the energy needed to emit a signal. Such radio-tags are commonly qualified as "active".

Furthermore, according to the invention, the stored location code can advantageously consist:
- either of an identifier specific to each radio-tag. Given this assumption, a preliminary learning phase is required to enable the central unit to associate a radio-tag position on the vehicle with each identifier,
- or an identifier linked to the position of the radio-tag on the vehicle, prerecorded in the central unit.

According to the invention, the electronic modules and the radio-tags are configured so as to activate each radio-tag upon the emission of an electromagnetic signal by the electronic module located in the vicinity of said radio-tag, and to insert said location code into said electromagnetic signal.

The activation of each radio-tag is triggered by one of the electromagnetic signals emitted by the adjacent electronic module, and the location code of the tag is transmitted so as to be inserted into said electromagnetic signal from the module.

The insertion of the location codes into the electromagnetic signals is then achieved by modulating the absorption/reflection of said electromagnetic signals.

Furthermore, for these insertions, and advantageously according to the invention:
- the emission by the electronic modules of electromagnetic signals incorporating a final portion consisting of a pure wave is controlled,
- and the radio-tags are activated so as to insert the location codes into the electromagnetic signals by modulating the absorption/reflection of said pure waves. Any disturbance of the data included in the signal from the module when the location codes of the tags are added is thus avoided.

With the modulation of the electromagnetic signals consisting in an amplitude modulation of said signals, this arrangement, which consists in modulating a terminal portion of the electromagnetic signal containing no data, leads to the elimination of any risk of degradation, by attenuation, of the message conveyed.

Furthermore, in order to save on the batteries installed in the electronic modules, and according to another advantageous mode of implementation of the invention, a final portion consisting of a pure wave is incorporated in the electromagnetic signals emitted by the electronic modules, only during the location procedure.

This insertion of the location codes into the electromagnetic signals is, furthermore, advantageously achieved by using a modulation frequency located outside the rotation frequency bands of the wheels. This arrangement makes it possible, in practice, to avoid any interference of the transmitted signal by the disturbances generated by the rotation of the wheels which also provokes a modulation of the amplitude of the transmitted signals.

Moreover, the radio-tags used in the context of the mode of implementation of the invention according to which the location codes are inserted into the electromagnetic signals are advantageously radio-tags of the so-called passive type.

In order to provide the energy needed to activate such passive tags, a first advantageous solution consists in using the electromagnetic signals delivered by the electronic modules to supply said radio-tags with the energy needed to emit a signal.

As a variant, a second advantageous solution, implemented when the central unit is provided with means of emitting electromagnetic signals to the electronic modules, consists in carrying out a preliminary phase for the emission of electromagnetic signals by said central unit, adapted to supply the various radio-tags with the energy needed to emit a signal.

The invention can, moreover, be implemented by using radio-tags of the active type equipped with a battery able to provide them with the energy needed to emit a signal.

Given this assumption, and according to an advantageous mode of implementation of the invention, the electronic modules and the radio-tags are configured so as to implement a location procedure consisting:
- in reading and storing, by each radio-tag, the identification code incorporated in the electromagnetic signals emitted by the electronic module located in the vicinity of said radio-tag,
- and, upon the activation of each radio-tag, in a transmission by the latter, to the central unit, of a signal incorporating the location code of this radio-tag associated with the stored identification code.

It should, furthermore, be noted that the batteries with which the radio-tags are equipped can consist either of conventional button cell batteries or of piezoelectric elements making it possible to transform the mechanical energy resulting from the vibrations of the vehicle into an electrical energy used to power the radio-tags.

The invention extends to a device for locating wheels of a vehicle comprising:
- at least (n-1) emission means (10-13) each arranged in a fixed position on the vehicle (V), in the vicinity of a wheel (1-4), each of said emission means including means of storing a code, called location code, able to be identified by the central unit (9) and to enable the latter to locate the position of said emission means on the vehicle (V),
- and means of activating each emission means (10-13) able to generate the transmission to the central unit (9) of a signal incorporating the location code of this radio-tag (10-13) associated with the identification code of the wheel (1-4) located in the vicinity of the latter, said location device being characterized in that it comprises:
- radio-tags, as emission means,
- means of controlling the emission by the electronic modules (5-8) of electromagnetic signals incorporating a final portion consisting of a pure wave, and in that the means of activating the radio-tags (10-13) insert the location codes into the electromagnetic signals by modulating the absorption/reflection of said pure waves.

Other features, aims and benefits of the invention will emerge from the detailed description that follows, given with reference to the appended drawing which represents a preferred embodiment thereof as a non-limiting example. In this drawing, the single FIG. 1 is a diagrammatic plan view of a vehicle provided with a system for monitoring the tire pressure, associated with a device according to the invention for locating the position of the wheels of said vehicle.

The location device according to the invention represented by way of example in FIG. 1 is designed to locate the position of the wheels of a vehicle.

This location device is more specifically designed to be installed on vehicles provided with a tire pressure monitoring system, such as that, represented in FIG. 1, used to equip a vehicle V provided with four wheels conventionally clad with a tire: two front wheels 1, 2 and two rear wheels 3, 4.

Such monitoring systems conventionally comprise, firstly, associated with each wheel 1-4, an electronic module 5-8, for example attached to the rim of said wheel so as to be positioned inside the jacket of the tire.

Each of these electronic modules 5-8 incorporates, for example, sensors dedicated to measuring parameters, such as tire pressure and/or temperature, a microprocessor-based computation unit having an identification code of said electronic module, and a radio frequency emitter connected to a high-frequency antenna.

The monitoring system also comprises a centralized computer or central unit 9 located in the vehicle V, comprising a microprocessor and incorporating a radio frequency receiver able to receive the electromagnetic signals emitted by the electronic modules 5-8.

Usually, such a monitoring system, and in particular its central unit 9, are designed to inform the driver of any abnormal variation of the parameters measured by the sensors incorporated in the electronic modules 5-8 with which the wheels 1-4 are equipped.

Associated with this monitoring system, and being an integral part of the latter, the function of the location device according to the invention is to make it possible to associate, with each signal received by the central unit 9, an indication concerning the position of the wheel 1-4 equipped with the electronic module 5-8 at the origin of this signal.

To this end, this location device comprises four radio-tags 10-13, each of said radio-tags:
- being positioned in the vicinity of a wheel 1-4, so as to be influenced by the electronic module 5-8 with which this wheel is equipped,
- including an antenna and a chip inside which is stored a location code that can be identified by the central unit 9 and designed to enable the latter to locate the position of said radio-tag on the vehicle V.

Furthermore, these radio-tags 10-13 are advantageously of the passive type, that is to say without any specific power source, and therefore have a very low cost price, and operate very reliably over time.

The procedure for locating each wheel 1-4 implemented by this location device can be as follows, taking, for example, the front right wheel 2 as the reference, and assuming the electronic modules 5-8 and the radio-tags 10-13 to be correctly configured, and in particular the emission frequencies of the latter to be tuned:
- emission by the electronic module 6 of electromagnetic signals incorporating the identification code of said module and a radio-tag 11 activation command, and incorporating a final portion consisting of a pure wave, said electromagnetic signals also being adapted to supply energy to the radio-tag 11,
- after recovery by the radio-tag 11 of a sufficient quantity of energy, emission by the latter of its location code. The radio-tag is adapted to insert this location code into the terminal pure wave of an electromagnetic signal emitted by the electronic module 6, by modulation of the absorption/reflection of said pure wave.

The electromagnetic signal that thus arrives at the central unit 9 therefore incorporates the location code of the radio-tag 11 associated with the identification code of the electronic module 6, and therefore makes it possible to locate said electronic module.

It should be noted that only three location procedures as described hereinabove are needed to locate the four wheels 1-4 of the vehicle V, because the location of the fourth wheel is deduced directly from the preceding measurements.

Consequently, in absolute terms, only three radio-tags are needed to ensure the location of the four wheels 1-4.

Moreover, once the location is acquired, the final portion consisting of a pure wave is eliminated from the electromagnetic signals emitted subsequently by the electronic modules 5-8, in order to save the energy of the batteries included in these modules.

In practice, the location method according to the invention is very efficient in terms of responsiveness and reliability. Furthermore, for its implementation, it requires simple radio-tags of minimal cost price.

The invention claimed is:

1. A method of locating wheels of a vehicle (V) on which are mounted n wheels (1-4) each equipped with an electronic module (5-8) designed to emit, to a central unit (9) mounted on said vehicle, electromagnetic signals representative of operating parameters of each wheel and an identification code of the latter, said location method comprising:
in having, in a fixed position on the vehicle (V), in the vicinity of at least (n-1) wheels (1-4), an emission means (10-13) in which is stored a code, called location code, able to be identified by the central unit (9) and to enable the latter to locate the position of said emission means on the vehicle (V),
and in implementing a location procedure comprising:
controlling an activation of each emission means (10-13) upon the emission of an electromagnetic signal by the electronic module (5-8) located in the vicinity of said emission means, and
in inserting said location code into said electromagnetic signal by modulating the absorption/reflection of said electromagnetic signals, and
in delivering to the central unit (9) a signal incorporating the location code of said emission means (10-13) associated with the identification code of the wheel (1-4) located in the vicinity of the latter,
said location method being characterized in that:
radio-tags are used as emission means,
the emission by the electronic modules (5-8) of electromagnetic signals incorporating a final portion comprising a pure wave is controlled, and
the radio-tags (10-13) are activated so as to insert the location codes into the electromagnetic signals by modulating the absorption/reflection of said pure waves.

2. The location method as claimed in claim 1, characterized in that a final portion comprising a pure wave is incorporated in the electromagnetic signals emitted by the electronic modules (5-8), only during the location procedure.

3. The location method as claimed in claim 1, characterized in that the location codes are inserted into the electromagnetic signals by using a modulation frequency located outside the rotation frequency bands of the wheels (1-4).

4. The location method as claimed in claim 1, characterized in that the radio-tags (10-13) are of the passive type, and in that the electromagnetic signals delivered by the electronic modules (5-8) are used to supply said radio-tags with the energy needed to emit a signal.

5. The location method as claimed in claim 1, characterized in that the radio-tags (10-13) are of the passive type and the central unit (9) is provided with means of emitting electromagnetic signals to the electronic modules (5-8), and in that a preliminary phase is implemented for the emission of electromagnetic signals by the central unit (9), adapted to supply the various radio-tags (10-13) with the energy needed to emit a signal.

6. The location method as claimed in claim 1, characterized in that:
- the radio-tags (10-13) are of the active type and are equipped with a battery able to provide them with the energy needed to emit a signal,
- the electronic modules (5-8) and the radio-tags (10-13) are configured so as to implement a location procedure comprising:
  - in reading and storing, by each radio-tag (10-13), the identification code incorporated in the electromagnetic signals emitted by the electronic module (5-8) located in the vicinity of said radio-tag,
  - and, upon the activation of each radio-tag (10-13), in a transmission by the latter, to the central unit (9), of a signal incorporating the location code of this radio-tag associated with the stored identification code.

7. A device for locating wheels of a vehicle (V) on which are mounted n wheels (1-4) each equipped with an electronic module (5-8) designed to emit, to a central unit (9) mounted on said vehicle, electromagnetic signals representative of operating parameters of each wheel (1-4) and an identification code of the latter, said location device comprising:
- at least (n-1) emission means (10-13) each arranged in a fixed position on the vehicle (V), in the vicinity of a wheel (1-4), each of said emission means including means of storing a code, called location code, able to be identified by the central unit (9) and to enable the latter to locate the position of said emission means on the vehicle (V),
- and means of activating each emission means (10-13) able to generate the transmission to the central unit (9) of a signal incorporating the location code of this radio-tag (10-13) associated with the identification code of the wheel (1-4) located in the vicinity of the latter, wherein said location device comprises:
- radio-tags, as emission means,
  - means of controlling the emission by the electronic modules (5-8) of electromagnetic signals incorporating a final portion comprising a pure wave, and
  - the means of activating the radio-tags (10-13) insert the location codes into the electromagnetic signals by modulating the absorption/reflection of said pure waves.

8. The location method as claimed in claim 2, characterized in that the location codes are inserted into the electromagnetic signals by using a modulation frequency located outside the rotation frequency bands of the wheels (1-4).

9. The location method as claimed in claim 2, characterized in that the radio-tags (10-13) are of the passive type, and in that the electromagnetic signals delivered by the electronic modules (5-8) are used to supply said radio-tags with the energy needed to emit a signal.

10. The location method as claimed in claim 2, characterized in that the radio-tags (10-13) are of the passive type and the central unit (9) is provided with means of emitting electromagnetic signals to the electronic modules (5-8), and in that a preliminary phase is implemented for the emission of electromagnetic signals by the central unit (9), adapted to supply the various radio-tags (10-13) with the energy needed to emit a signal.

11. The location method as claimed in claim 3, characterized in that the radio-tags (10-13) are of the passive type, and in that the electromagnetic signals delivered by the electronic modules (5-8) are used to supply said radio-tags with the energy needed to emit a signal.

12. The location method as claimed in claim 3, characterized in that the radio-tags (10-13) are of the passive type and the central unit (9) is provided with means of emitting electromagnetic signals to the electronic modules (5-8), and in that a preliminary phase is implemented for the emission of electromagnetic signals by the central unit (9), adapted to supply the various radio-tags (10-13) with the energy needed to emit a signal.

13. The location method as claimed in claim 4, characterized in that the radio-tags (10-13) are of the passive type and the central unit (9) is provided with means of emitting electromagnetic signals to the electronic modules (5-8), and in that a preliminary phase is implemented for the emission of electromagnetic signals by the central unit (9), adapted to supply the various radio-tags (10-13) with the energy needed to emit a signal.

* * * * *

UNITED STATES PATENT AND TRADEMARK OFFICE
CERTIFICATE OF CORRECTION

PATENT NO. : 8,405,495 B2
APPLICATION NO. : 12/601641
DATED : March 26, 2013
INVENTOR(S) : Heller et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 579 days.

Signed and Sealed this
First Day of September, 2015

Michelle K. Lee
*Director of the United States Patent and Trademark Office*